(12) United States Patent
Xu et al.

(10) Patent No.: US 12,173,416 B2
(45) Date of Patent: Dec. 24, 2024

(54) HIGH-TEMPERATURE ALKALINE WATER ELECTROLYSIS USING A COMPOSITE ELECTROLYTE SUPPORT MEMBRANE

(71) Applicant: Giner, Inc., Newton, MA (US)

(72) Inventors: Hui Xu, Acton, MA (US); Andrew Sweet, Boxborough, MA (US); Winfield Greene, Lexington, MA (US); Kailash Patil, Lincoln, MA (US)

(73) Assignee: GINER, INC., Newton, MA (US)

( * ) Notice: Subject to any disclaimer, the term of this patent is extended or adjusted under 35 U.S.C. 154(b) by 479 days.

(21) Appl. No.: 16/590,266

(22) Filed: Oct. 1, 2019

(65) Prior Publication Data

US 2020/0102663 A1 Apr. 2, 2020

Related U.S. Application Data (60) Provisional application No. 62/739,416, filed on Oct. 1, 2018.

(51) Int. Cl.
*C25B 13/02* (2006.01)
*C25B 1/04* (2021.01)
(Continued)

(52) U.S. Cl.
CPC .............. *C25B 13/02* (2013.01); *C25B 1/04* (2013.01); *C25B 9/19* (2021.01); *C25B 9/73* (2021.01); *C25B 13/04* (2013.01)

(58) Field of Classification Search
CPC ........... C25B 1/04; C25B 13/02; C25B 13/04; C25B 13/05; C25B 13/07
See application file for complete search history.

(56) References Cited

U.S. PATENT DOCUMENTS

| | | | | |
|---|---|---|---|---|
| 4,115,632 A | * | 9/1978 | Kinoshita | ............... C01F 7/043 |
| | | | | 429/533 |
| 4,247,499 A | | 1/1981 | Glugla et al. | |

(Continued)

FOREIGN PATENT DOCUMENTS

GB 2546770 A * 8/2017 ........... C25B 11/031

OTHER PUBLICATIONS

Hemmes, K., Innovative membrane induced functionalities of fuel cells, International Journal of Hydrogen Energy, vol. 41, No. 41, Nov. 2016, pp. 18837-18845 (Year: 2016).*

(Continued)

*Primary Examiner* — Harry D Wilkins, III
(74) *Attorney, Agent, or Firm* — KRIEGSMAN & KRIEGSMAN (57) ABSTRACT

A composite membrane that is suitable for use in a molten alkaline water electrolyzer. In one embodiment, the composite membrane includes a porous support, the porous support being in the form of a matrix of metal oxide particles randomly arranged to form a plurality of tortuous pores. The composite membrane also includes molten electrolyte filling the pores of the porous support, the molten electrolyte having hydroxide ion conductivity. The molten electrolyte may be a single species of an alkali hydroxide or of an alkaline earth hydroxide. Alternatively, the molten electrolyte may be a eutectic or non-eutectic mixture of two or more species of alkali hydroxides or alkaline earth hydroxides. The composite membrane may further include one or more additives, such as a coarsening inhibitor, a crack attenuator, and a reinforcing material. The composite material may be used to make a molten alkaline membrane water electrolyzer with high electrical efficiencies.

33 Claims, 7 Drawing Sheets

(51) Int. Cl.
*C25B 9/19* (2021.01)
*C25B 9/73* (2021.01)
*C25B 13/04* (2021.01)

(56) References Cited

U.S. PATENT DOCUMENTS

| | | | |
|---|---|---|---|
| 4,322,482 A * | 3/1982 | Bushnell | H01M 8/0295 |
| | | | 429/516 |
| 4,604,177 A | 8/1986 | Silvilotti | |
| 4,781,995 A | 11/1988 | Giner | |
| 5,944,661 A | 8/1999 | Swette et al. | |
| 6,179,986 B1 | 1/2001 | Swette et al. | |
| 6,464,846 B1 | 10/2002 | Titterington | |
| 6,500,319 B2 | 12/2002 | LaConti et al. | |
| 6,669,826 B1 | 12/2003 | Milgate, Jr. et al. | |
| 6,685,821 B2 | 2/2004 | Kosek et al. | |
| 6,692,861 B2 | 2/2004 | Tao | |
| 6,793,711 B1 | 9/2004 | Sammells | |
| 6,811,905 B1 | 11/2004 | Cropley et al. | |
| 6,852,441 B2 | 2/2005 | Milgate, Jr. et al. | |
| 7,229,534 B2 | 6/2007 | LaConti et al. | |
| 7,252,747 B2 | 8/2007 | McDonald et al. | |
| 7,261,967 B2 | 8/2007 | LaConti et al. | |
| 7,324,329 B2 | 1/2008 | Dweik et al. | |
| 7,326,736 B2 | 2/2008 | McDonald et al. | |
| 7,438,985 B2 | 10/2008 | LaConti et al. | |
| 7,629,071 B2 | 12/2009 | Liu et al. | |
| 7,704,627 B2 | 4/2010 | LaConti et al. | |
| 7,807,063 B2 | 10/2010 | Liu et al. | |
| 7,811,433 B2 | 10/2010 | Manoukian et al. | |
| 7,867,669 B2 | 1/2011 | Liu et al. | |
| 7,897,285 B2 | 3/2011 | Norman et al. | |
| 7,947,405 B2 | 5/2011 | Mittlesteadt et al. | |
| 7,976,989 B2 | 7/2011 | Lopez et al. | |
| 8,083,821 B2 | 12/2011 | Tempelman et al. | |
| 8,182,659 B2 | 5/2012 | LaConti et al. | |
| 8,282,811 B2 | 10/2012 | Kosek et al. | |
| 8,349,151 B2 | 1/2013 | Schmitt et al. | |
| 8,361,308 B2 | 1/2013 | Manoukian et al. | |
| 8,366,894 B2 | 2/2013 | Manoukian et al. | |
| 8,551,670 B2 | 10/2013 | Mittelsteadt et al. | |
| 8,758,946 B2 | 6/2014 | McDonald | |
| 8,962,132 B2 | 2/2015 | Liu et al. | |
| 9,246,188 B2 | 1/2016 | Zhao et al. | |
| 9,357,764 B2 | 6/2016 | Tempelman et al. | |
| 9,537,169 B2 | 1/2017 | Mittelsteadt et al. | |
| 9,595,727 B2 | 3/2017 | Mittelsteadt et al. | |
| 9,728,802 B2 | 8/2017 | Mittelsteadt et al. | |
| 10,091,985 B2 | 10/2018 | Tempelman et al. | |
| 10,128,496 B2 | 11/2018 | Laicer et al. | |
| 10,231,817 B2 | 3/2019 | Tempelman et al. | |
| 10,557,691 B2 | 2/2020 | Stone et al. | |
| 11,024,876 B2 | 6/2021 | Xu et al. | |
| 11,033,666 B2 | 6/2021 | Ferrante et al. | |
| 11,092,585 B2 | 8/2021 | Dweik et al. | |
| 11,124,885 B2 | 9/2021 | Xu et al. | |
| 2004/0116546 A1 | 6/2004 | Kosek et al. | |
| 2008/0157419 A1 | 7/2008 | Ryu et al. | |
| 2009/0045073 A1 | 2/2009 | Stone et al. | |
| 2009/0218235 A1 | 9/2009 | McDonald et al. | |
| 2009/0294283 A1 | 12/2009 | Norman et al. | |
| 2010/0151335 A1 | 6/2010 | Senga et al. | |
| 2010/0255353 A1 | 10/2010 | McDonald et al. | |
| 2011/0097678 A1 | 4/2011 | Patch et al. | |
| 2011/0266142 A1 | 11/2011 | Norman et al. | |
| 2011/0287333 A1 * | 11/2011 | Shin | H01M 8/145 |
| | | | 429/535 |
| 2012/0103823 A1 | 5/2012 | Dweik et al. | |
| 2012/0111198 A1 | 5/2012 | Liu et al. | |
| 2013/0130126 A1 | 5/2013 | McDonald et al. | |
| 2014/0050999 A1 * | 2/2014 | Tolmachev | H01M 8/22 |
| | | | 429/418 |
| 2014/0072836 A1 * | 3/2014 | Mills | H01M 14/00 |
| | | | 429/422 |
| 2014/0234726 A1 | 8/2014 | Christensen et al. | |
| 2015/0064606 A1 | 3/2015 | Dekempeneer et al. | |
| 2015/0349368 A1 | 12/2015 | Arges et al. | |
| 2016/0181585 A1 | 6/2016 | Choi et al. | |
| 2016/0190640 A1 | 6/2016 | Visco et al. | |
| 2016/0211498 A1 | 7/2016 | Kim et al. | |
| 2016/0368777 A1 | 12/2016 | Goodenough et al. | |
| 2017/0005367 A1 | 1/2017 | Van Berkel | |
| 2017/0025705 A1 | 1/2017 | Miara et al. | |
| 2017/0275172 A1 | 9/2017 | Zhao et al. | |
| 2017/0333834 A1 | 11/2017 | Worsley et al. | |
| 2018/0131017 A1 * | 5/2018 | Hilmi | H01M 8/145 |
| 2018/0166741 A1 | 6/2018 | Xu et al. | |
| 2018/0209955 A1 | 7/2018 | Moeller | |
| 2018/0318566 A1 | 11/2018 | Ferrante et al. | |
| 2019/0246958 A1 | 8/2019 | Moeller et al. | |
| 2019/0343616 A1 | 11/2019 | Stone | |
| 2019/0368056 A1 | 12/2019 | Schwenk et al. | |
| 2019/0379063 A1 * | 12/2019 | Campbell | H01M 8/0236 |
| 2020/0397340 A1 | 12/2020 | Dweik | |
| 2020/0400695 A1 | 12/2020 | Dweik et al. | |
| 2021/0305598 A1 | 9/2021 | Hamdan et al. | |
| 2022/0054318 A1 | 2/2022 | Schwenk et al. | |
| 2022/0069315 A1 | 3/2022 | Wu et al. | |

OTHER PUBLICATIONS

Filipponi et al, Use of Molten Carbonate Fuel Cell for CO2 Capture, ECS Transactions, vol. 42, No. 1, 2012 (no month available), pp. 43-47 (Year: 2012).*

Masset et al, Retained molten salt electrolytes in thermal batteries, Journal of Power Sources, vol. 139, No. 1-2, Jan. 2005, pp. 356-365 (Year: 2005).*

Heo et al, Coarsening mechanism of LiAlO2 in acidic and basic molten carbonate salts, Corrosion Science, vol. 190, Sep. 2021, pp. 109691-1 to 109691-4 (Year: 2021).*

Heo et al, Stability of LiAlO2 in Molten Carbonate Fuel Cell: Mechanism of Particle Coarsening and Phase Transformation, University of Connecticut thesis, Jun. 2018, pp. 1-127, available online at https://opencommons.uconn.edu/cgi/viewcontent.cgi?article=8136 &context=dissertations (Year: 2018).*

Yu, Wequing, Development of Electrolyte Support for Intermediate Temperature Molten Salt Fuel Cell, Worcester Polytechnic Institute thesis, Dec. 2009, pp. 1-72, available online at https://web.wpi.edu/Pubs/ETD/Available/etd-020411-103330/ (Year: 2009).*

Xu et al., "High Temperature Alkaline Water Electrolysis," Giner, Inc., Jun. 7, 2017.

International Search Report mailed Dec. 30, 2019, in corresponding PCT Application No. PCT/US19/54152.

Written Opinion mailed Dec. 30, 2019, in corresponding PCT Application No. PCT/US19/54152.

Abbasi et al., "A Roadmap to Low-Cost Hydrogen with Hydroxide Exchange Membrane Electrolyzers," Adv. Mater., 1805876, 1-14 (2019).

Schefold et al., "23,000 h steam electrolysis with an electrolyte supported solid oxide cell," International Journal of Hydrogen Energy, 42:13415-13426 (2017).

Mefford et al., "Water electrolysis on La1-xSrxCoO3-δ perovskite electrocatalysts," Nature Communications, 7:11053 (1-11) (2016).

Allebrod et al., "Alkaline electrolysis cell at high temperature and pressure of 250°C and 42 bar," Journal of Power Sources, 229:22-31 (2013).

Leng et al., "Solid-State Water Electrolysis with an Alkaline Membrane," J. Am. Chem. Soc., 134:9054-9057 (2012).

Merle et al., "Anion exchange membranes for alkaline fuel cells: A review," Journal of Membrane Science, 377:1-35 (2011).

Kerman et al., "Review-Practical Challenges Hindering the Development of Solid State Li Ion Batteries," Journal of the Electrochemical Society, 164(7):A1731-A1744 (2017).

Sakuda et al., "Sulfide Solid Electrolyte with Favorable Mechanical Property for All-Solid-State Lithium Battery," Sci. Rep., 3; 2261: DOI/10.1038/srep02261, pp. 1-5 (2013).

Kanehori et al., "Kinetic Study on Chemical Vapor Deposition of Titanium Disulfide Thin Film," J. Electrochem. Soc., 136(5):1265-1270 (1989).

(56) References Cited

OTHER PUBLICATIONS

Choi et al., "Radio-Frequency Magnetron Sputtering Power Effect on the Ionic Conductivities of Lipon Films," Electrochemical and Solid-State Letters, 5(1): A14-A17 (2002).
Kuwata et al., "Thin Film Batteries with Li3PO4 Solid Electrolyte Fabricated by Pulsed Laser Deposition," ECS Transactions, 16(26):53-60 (2009).
Schaefer et al., "Electrolytes for high-energy lithium batteries," Applied Nanoscience, 2:91-109 (2012).
Jung et al., "Hybrid Solid Electrolyte Composed of Lithium Aluminum Germanium Phosphate and Poly(ethylene oxide) for All Solid-State Lithium Batteries," ECS Meeting Abstracts, 2:391 (2014).
Shigeo Kondo, "All Solid-State Lithium Secondary Battery with Highly Ion Conductive Glassy Electrolyte," pp. 199-217 of Lithium Ion Batteries: Fundamentals and Performance, edited by Wakihara et al., published jointly by Kodansha Ltd., Tokyo, Japan, and Wiley-VCH Verlag GmbH, Weinheim, Germany (1998).
Braga et al., "Novel Li3ClO based glasses with superionic properties for lithium batteries," J. Mater. Chem. A, 2:5470-5480 (2014).
Epp et al., "Very fast bulk Li ion diffusivity in crystalline Li1.5Al0.5Ti1.5(PO4)3 as seen using NMR relaxometry," Phys. Chem. Chem. Phys., 17:32115-32121 (2015).
Lu et al., "Antiperovskite Li3OCl3 Superionic Conductor Films for Solid-State Li-Ion Batteries," Adv. Sci., 3:1500359 (1-5) (2016).
Patil et al., "High-Temperature Molten Alkaline Water Electrolysis," ECS Meeting Abstracts, vol. MA2018-01, No. 29, 1693 (Apr. 13, 2018).

\* cited by examiner

HIGH-TEMPERATURE ALKALINE WATER ELECTROLYSIS USING A COMPOSITE ELECTROLYTE SUPPORT MEMBRANE

CROSS-REFERENCE TO RELATED APPLICATIONS

The present application claims the benefit under 35 U.S.C. 119(e) of U.S. Provisional Patent Application No. 62/739,416, inventors Hui Xu et al., filed Oct. 1, 2018, the disclosure of which is incorporated herein by reference.

FEDERALLY SPONSORED RESEARCH OR DEVELOPMENT

This invention was made with government support under Contract No. DE-EE0007644 awarded by the Department of Energy. The government has certain rights in the invention.

BACKGROUND OF THE INVENTION

The present invention relates generally to the electrolysis of water and relates more particularly to the electrolysis of water using an alkaline membrane electrolyte water electrolyzer.

The increasing development and deployment of fuel cells and other devices that use hydrogen ($H_2$) have highlighted the need to produce hydrogen in an efficient and economical manner. Existing techniques for producing hydrogen include water electrolysis and methane reforming. Hydrogen production via water electrolysis (i.e., using a water electrolyzer) is an attractive approach due to its high efficiency, fast ramp rates, and high-pressure capability. However, current hydrogen production via water electrolysis comprises only a small fraction of the global hydrogen market due to the high cost associated with many water electrolyzer components (e.g., membrane, catalyst, and bipolar plates) and due to the high electricity consumption of many commercially available electrolysis systems.

The prohibitive feedstock cost of water electrolysis significantly restricts its wide application, particularly as compared to the much less expensive technique of methane reforming. Consequently, despite the fact that the coupling of water electrolysis with off-peak renewable energy (e.g., wind or solar) offers some new opportunities, electrical efficiency of water electrolysis needs to improve to increase economic viability.

Currently, there are two major categories of commercial water electrolyzers: (1) polymer electrolyte membrane (PEM) water electrolyzers (sometimes alternatively referred to as proton exchange membrane electrolyzers); and (2) alkaline water electrolyzers. PEM water electrolyzers and alkaline water electrolyzers differ most notably from one another in that PEM water electrolyzers include an electrolyte designed to conduct protons ($H^+$) whereas alkaline water electrolyzers include an electrolyte designed to conduct hydroxyl ions ($OH^-$) (also sometimes referred to as hydroxide ions). Another distinction between the two types of electrolyzers is that PEM water electrolyzers typically require the use of platinum-group metal catalysts, which are very expensive, whereas alkaline water electrolyzers typically do not require that its catalysts be platinum-group metals.

Between PEM water electrolyzers and alkaline water electrolyzers, alkaline water electrolyzers have a more mature technology. As a result, due, in part, to their greater maturity and due, in part, to their lack of a need for precious materials (thereby resulting in a lower capital cost), alkaline water electrolyzers dominate over PEM water electrolyzers in commercial large-scale electrolysis applications. Nevertheless, despite the prevalence of alkaline water electrolyzers in commercial large-scale electrolysis applications, conventional alkaline water electrolyzers typically suffer from poor efficiencies, low current densities, and an accompanying large footprint. Moreover, to make matters worse for their possible use in hydrogen generation from renewable energy sources, conventional alkaline water electrolyzers are typically unable to generate high/differential pressures, and conventional alkaline water electrolyzers cannot typically rapidly ramp up and down with transient sources. PEM water electrolyzers overcome a number of these limitations by allowing high current densities, as well as high and differential pressures. Nevertheless, though efficiency is improved with PEM water electrolyzers, low oxygen evolution reaction (OER) kinetics at the modest temperatures discussed above still result in large over-potentials. Consequently, both existing alkaline water electrolyzers and existing PEM water electrolyzers suffer from certain shortcomings.

In an alkaline water electrolyzer, two water molecules are reduced at the cathode to produce molecular hydrogen and two hydroxyl ions, this process being known as the hydrogen evolution reaction (HER). The foregoing reaction at the cathode is as follows:

$$2H_2O + 2e^- \rightarrow 2OH^- + H_2$$

At the anode of the alkaline water electrolyzer, two hydroxyl ions are oxidized into molecular oxygen, this process being known as the oxygen evolution reaction (OER). The foregoing reaction at the anode is as follows:

$$2OH^- \rightarrow H_2O + \tfrac{1}{2}O_2 + 2e^-$$

The overall water electrolysis reaction is then as follows:

$$H_2O \rightarrow H_2 + \tfrac{1}{2}O_2$$

In the above circumstances, it is understood that an electrical power source is required to draw electrons from the anode to the cathode in order to overcome the electrochemical reaction potential. The electrolyte, which is placed between the anode and the cathode, allows the hydroxyl ions to pass and to transport from the cathode to the anode.

Traditionally, alkaline water electrolyzers have included one of the following two types of electrolyte systems: (1) an aqueous electrolyte solution; or (2) a microporous diaphragm permeable to $OH^-$ that separates the product gases between the two electrodes. On the other hand, a microporous diaphragm can be replaced by a polymer-based alkaline exchange membrane; however, most alkaline exchange membranes tend to have poor chemical stability under electrochemically oxidative conditions of water electrolyzers. More specifically, alkaline exchange membranes are very susceptible to chemical degradation, particularly when used at temperatures above about 60° C.-80° C. Consequently, alkaline exchange membranes must be used at relatively low temperatures (i.e., less than about 60° C.-80° C.) or else they tend to decompose. However, the need to use alkaline exchange membranes at a relatively low temperature is disadvantageous because higher operating temperatures tend to lead to higher electrical efficiencies of water electrolyzers.

More recently, a third type of electrolyte has found use in water electrolyzers, this third type of electrolyte being known as a solid oxide electrolyte. The aforementioned solid oxide electrolyte is used in a water electrolyzer known as a solid oxide electrolyzer cell (SOEC). Solid oxide electrolyzer cells offer the advantage of lower energy requirements due to both higher kinetics and greatly reduced equilibrium voltages; however, solid oxide electrolyzer cells typically require extremely high operating temperatures (e.g., greater than 800° C.). Such extremely high temperatures can be difficult to maintain and can lead to the degradation of various electrolyzer components.

Documents that may be of interest may include the following, all of which are incorporated herein by reference: U.S. Pat. No. 7,976,989 B2, inventors Lopez et al., issued Jul. 12, 2011; U.S. Patent Application Publication No. US 2015/0349368 A1, inventors Arges et al., published Dec. 3, 2015; Abbasi et al., "A Roadmap to Low-Cost Hydrogen with Hydroxide Exchange Membrane Electrolyzers," *Adv. Mater.*, 1805876, 1-14 (2019); Schefold et al., "23,000 h steam electrolysis with an electrolyte supported solid oxide cell," *International Journal of Hydrogen Energy*, 42:13415-13426 (2017); Mefford et al., "Water electrolysis on $La_{1-x}Sr_xCoO_{3-\delta}$ perovskite electrocatalysts," *Nature Communications*, 7:11053 (1-11) (2016); Allebrod et al., "Alkaline electrolysis cell at high temperature and pressure of 250° C. and 42 bar," Journal of Power Sources, 229:22-31 (2013); Leng et al., "Solid-State Water Electrolysis with an Alkaline Membrane," *J. Am. Chem. Soc.*, 134:9054-9057 (2012); and Merle et al., "Anion exchange membranes for alkaline fuel cells: A review," *Journal of Membrane Science*, 377:1-35 (2011).

SUMMARY OF THE INVENTION

According to one aspect of the invention, there is provided a composite membrane suitable for use in an alkaline membrane water electrolyzer, the composite membrane comprising (a) a porous support, the porous support comprising a plurality of pores; and (b) a molten electrolyte, the molten electrolyte disposed within the pores of the porous support, the molten electrolyte having hydroxide ion conductivity.

In a more detailed feature of the invention, the porous support may comprise a matrix of particles arranged randomly, and the plurality of pores may comprise tortuous pores formed at least in part by spaces between the particles.

In a more detailed feature of the invention, the particles may comprise one or more types of metal oxide particles.

In a more detailed feature of the invention, the one or more types of metal oxide particles may be selected from the group consisting of $LiAlO_2$ particles, $ZrO_2$ particles, yttria-stabilized zirconia particles, $Al_2O_3$ particles, $TiO_2$ particles, MgO particles, and combinations thereof.

In a more detailed feature of the invention, the metal oxide particles may have a particle size of about 0.2 μm to about 1.0 μm.

In a more detailed feature of the invention, the porous support may have a pore size of about 0.05 μm to about 2 ηm, may have a porosity of about 30% to about 80%, and may have a thickness of about 100 μm to about 400 μm.

In a more detailed feature of the invention, the porous support may have a pore size of about 0.1 μm to about 0.2 μm.

In a more detailed feature of the invention, the porous support may have a porosity of about 45% to about 55%.

In a more detailed feature of the invention, the molten electrolyte may completely fill the pores of the porous support.

In a more detailed feature of the invention, the molten electrolyte may have a melting temperature in the range of about 200° C. to about 600° C.

In a more detailed feature of the invention, the molten electrolyte may comprise at least one member of the group consisting of alkali hydroxides and alkaline earth hydroxides.

In a more detailed feature of the invention, the molten electrolyte may be at least one type of alkali hydroxide.

In a more detailed feature of the invention, the molten electrolyte may be a single species of alkali hydroxide selected from the group consisting of lithium hydroxide, sodium hydroxide, potassium hydroxide and cesium hydroxide.

In a more detailed feature of the invention, the molten electrolyte may be a combination of two or more species of alkali hydroxide selected from the group consisting of lithium hydroxide, sodium hydroxide, potassium hydroxide and cesium hydroxide.

In a more detailed feature of the invention, the molten electrolyte may be a eutectic mixture of at least two species of alkali hydroxide selected from the group consisting of lithium hydroxide, sodium hydroxide, potassium hydroxide and cesium hydroxide.

In a more detailed feature of the invention, the composite membrane may further comprise a coarsening inhibitor.

In a more detailed feature of the invention, the coarsening inhibitor may comprise at least one species selected from the group consisting of $\alpha-Al_2O_3$, $MnO_2$, $Fe_2O_3$, $\alpha-LiAlO_2$, $LiFe_2O_3$.

In a more detailed feature of the invention, the composite membrane may further comprise a crack attenuator.

In a more detailed feature of the invention, the crack attenuator may comprise at least one species selected from the group consisting of $\alpha-Al_2O_3$, stabilized zirconia, $CeO_2$, and $ZrO_2-Al_2O_3$.

In a more detailed feature of the invention, the composite membrane may further comprise a reinforcing material.

In a more detailed feature of the invention, the reinforcing material may comprise particles of at least one of aluminum, cerium oxide, and zirconium oxide.

According to another aspect of the invention, there is provided a method of making a composite membrane, the composite membrane being suitable for use in an alkaline membrane water electrolyzer, the method comprising the steps of (a) forming a porous support, the porous support having a plurality of pores; and (b) filling the pores with a molten electrolyte, the molten electrolyte having hydroxide ion conductivity.

In a more detailed feature of the invention, the filling step may be performed after the forming step.

In a more detailed feature of the invention, the forming step may comprise sintering a plurality of metal oxide particles to form a matrix of metal oxide particles arranged randomly.

In a more detailed feature of the invention, the forming step may comprise preparing a slurry comprising metal oxide particles and then tape casting the slurry.

In a more detailed feature of the invention, the filling step may comprise adding molten electrolyte, from outside the porous support, to the pores of the porous support.

In a more detailed feature of the invention, the adding step may comprise impregnating an electrolyzer component other than the porous support with a solid form of the molten electrolyte, positioning the electrolyzer component in proximity to the porous support, and then heating the electrolyzer component sufficiently to cause the solid form of the molten electrolyte to become molten, whereby the molten electrolyte may flow from the electrolyzer component to the porous support.

In a more detailed feature of the invention, the forming and filling steps may be performed concurrently.

In a more detailed feature of the invention, the filling step and the forming step may be performed concurrently by sintering a mixture of metal oxide particles and metal hydroxide particles.

In a more detailed feature of the invention, the method may further comprise, after the filling step, allowing the molten electrolyte to solidify in the pores.

According to another aspect of the invention, there is provided a composite membrane made by any of the above methods.

According to another aspect of the invention, there is provided an alkaline membrane water electrolyzer, the alkaline membrane water electrolyzer comprising (a) a composite membrane as described above; (b) an anode operatively coupled to the composite membrane; and (c) a cathode operatively coupled to the composite membrane.

According to another aspect of the invention, there is provided an alkaline membrane water electrolyzer, the alkaline membrane water electrolyzer comprising (a) a porous support, the porous support comprising a plurality of pores; (b) an anode operatively coupled to the porous support; (c) an anode frame, the anode frame housing the anode; (d) a cathode operatively coupled to the porous support; and (e) cathode frame, the cathode frame housing the cathode; (f) wherein at least one of the anode, the anode frame, the cathode, and the cathode frame is impregnated with a meltable electrolyte having hydroxide ion conductivity, whereby sufficient heating of the meltable electrolyte causes the meltable electrolyte to flow into the pores of the porous support.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions for purposes of explication. In the drawings wherein like reference numeral represent like parts.

DETAILED DESCRIPTION OF THE INVENTION

The present invention is directed, in part, at a novel composite membrane and, in part, at an alkaline membrane water electrolyzer that includes said composite membrane. In addition, the present invention is also directed at methods of making and using the aforementioned composite membrane and at methods of making and using the aforementioned alkaline membrane water electrolyzer.

Figure 1:
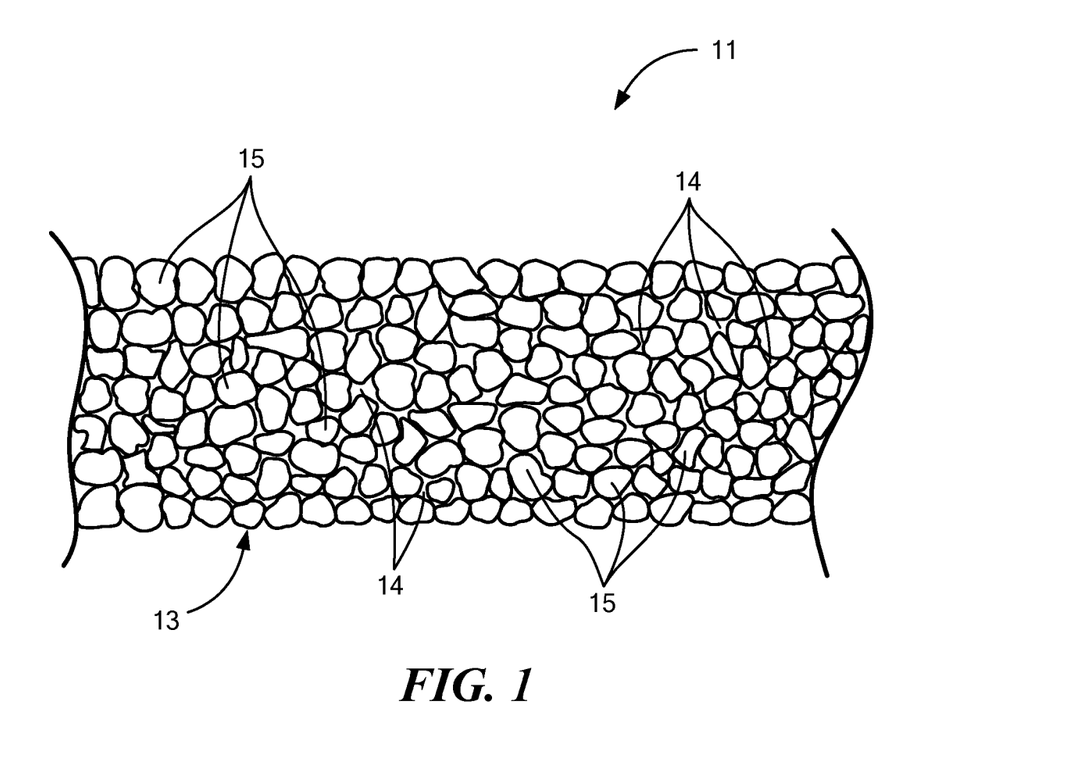
FIG. 1 is a simplified section view of one embodiment of a composite membrane constructed according to the present invention.

Referring now to FIG. 1, there is shown a simplified schematic section view of one embodiment of a composite membrane constructed according to the teachings of the present invention, the composite membrane being represented generally by reference numeral 11. Details of composite membrane 11 that are discussed elsewhere in this application or that are not critical to an understanding of the invention may be omitted from FIG. 1 and/or from the accompanying description herein or may be shown in FIG. 1 and/or described herein in a simplified manner.

Composite membrane 11 may comprise a porous support 13 and an electrolyte 14, with electrolyte 14 substantially completely filling all or nearly all of the pores of porous support 13.

Porous support 13 may be a generally flat, sheet-like structure that is both dimensionally-stable and sufficiently flexible to permit its use in an alkaline membrane water electrolyzer. Porous support 13 may consist of or comprise a material that is non-conductive to ions, particularly hydroxide ions, and preferably has a higher melting temperature than does electrolyte 14 so that porous support 13 may remain solid under temperatures or other conditions at which electrolyte 14 may be caused to liquefy.

According to the present embodiment, porous support 13 may be formed by the aggregation of a plurality of particles 15 to form a matrix having an unordered or random structure. As a result, pores may be provided in porous support 13 in the spaces between particles 15, with such pores largely extending in a tortuous fashion through porous support 13. Preferably, the pores of porous support 13 are designed to retain electrolyte 14 in a molten state therewithin. Without wishing to limit the present invention to any particularly theory of its operation, it is believed that the matrix of porous support 13, which may include many fine pores, absorbs and retains molten electrolyte via capillary forces.

As will be discussed further below, the fabrication of porous support 13 from particles 15 may be achieved by techniques including, but not limited to, sintering (i.e., applying heat and/or pressure) and tape casting.

Particles 15 may consist of or comprise particles of one or more metal oxides and, in particular, may be particles of one or more oxides of an alkali metal, an alkaline earth metal, a transition metal, an inner transition metal, and an earth metal. For example, particles 15 may be one or more metal oxides of metals like aluminum, zirconium, titanium, and magnesium. More specifically, the one or more metal oxides may be one or more of $LiAlO_2$, $ZrO_2$, yttria-stabilized zirconia (YSZ), $Al_2O_3$, $TiO_2$, and MgO. Alternatively to or in addition to being one or more metal oxides, particles 15 may be particles of an oxyanion of aluminum, of zirconium, of titanium, or of another metal, or may be a carbide, a boride, a metal, a nonmetal, or a nonmetal oxide. Prior to their aggregation to form porous support 13, particles 15 may have a particle size of about 0.2 µm to about 1.0 µm.

Porous support 13 may have a pore size of about 0.05 µm to about 2 µm, preferably about 0.08 µm to about 0.8 µm, and more preferably about 0.1 µm to about 0.2 µm. In addition, porous support 13 may have a porosity of about 30% to about 80%, preferably about 40% to about 70%, and more preferably about 45% to about 55%. Additionally, porous support 13 may have a thickness of about 100 µm to about 400 µm. Where, for example, particles 15 are made of yttria-stabilized zirconia, such particles may be present in an amount constituting about 10 vol. % to about 80 vol. % of the entire solid volume.

Although, as shown in FIG. 1, porous support 13 preferably comprises an aggregation of particles and preferably includes pores that extend tortuously and randomly, either partially or entirely, through porous support 13, the porous support of the present invention need not be limited to this preferred structure and may alternatively include, for example, a porous support in the form of a block of a metal oxide or another suitable material in which pores, whether tortuous or non-tortuous, are provided therein. In addition, as shown in FIG. 1, although porous support 13 preferably comprises pores of non-uniform size and shape and of dimensions that may vary over their respective lengths, the porous support of the present invention need not be limited to such a preferred structure and may alternatively include, for example, pores of a uniform size and shape and of non-varying dimensions over their respective lengths.

Electrolyte 14 may be one or more electrolytes having hydroxide ion conductivity. As noted above, electrolyte 14 may completely fill all of the pores of porous support 13 or may substantially completely fill all or nearly all of the pores of porous support 13. As will be discussed further below, this may be accomplished, during the fabrication of composite membrane 11, by melting one or more electrolytes having hydroxide ion conductivity and having the one or more molten electrolytes completely fill or substantially completely all, or nearly all, of the pores of porous support 13. Afterwards, the one or more molten electrolytes may cool and re-solidify within the pores of porous support 13 to form electrolyte 14. Then, during operation of an alkaline membrane water electrolyzer or other device that includes composite membrane 11, electrolyte 14 may be heated to a temperature at which it may become molten once again. While in said molten state, electrolyte 14 is preferably retained within the pores of porous support 13.

The one or more electrolytes used to make electrolyte 14 preferably melt at a temperature below the melting temperature of porous support 13 and more preferably melt at a temperature somewhere within the range of about 200° C. to about 600° C., preferably about 250° C. to about 550° C.

Examples of suitable electrolytes for electrolyte 14 may include, but are not limited to, alkali hydroxides and alkaline earth hydroxides, with lithium hydroxide (LiOH), sodium hydroxide (NaOH), potassium hydroxide (KOH), and cesium hydroxide (CsOH) being particularly well-suited for use as electrolyte 14. In one embodiment, electrolyte 14 may consist of a single hydroxide electrolyte, such as, but not limited to, one of lithium hydroxide, sodium hydroxide, potassium hydroxide, cesium hydroxide, etc. In another embodiment, electrolyte 14 may be a binary system that consists of a mixture of two different hydroxide electrolytes, such as, but not limited to, a lithium hydroxide-sodium hydroxide mixture, a lithium hydroxide-potassium hydroxide mixture, a sodium hydroxide-potassium hydroxide mixture, a lithium hydroxide-cesium hydroxide mixture, etc. In yet another embodiment, electrolyte 14 may be a ternary system that consists of a mixture of three different hydroxide electrolytes, such as, but not limited to, a lithium hydroxide-sodium hydroxide-potassium hydroxide mixture, a lithium hydroxide-sodium hydroxide-cesium hydroxide mixture, a lithium hydroxide-potassium hydroxide-cesium hydroxide mixture, a sodium hydroxide-potassium hydroxide-cesium hydroxide mixture, etc.

One benefit or advantage to using one or more alkali hydroxides as the electrolyte is that these compounds are relatively inexpensive. Another benefit or advantage is that molten hydroxide electrolytes tend to have a higher conductivity at elevated temperatures (e.g., 0.55 S/cm at 550° C.).

Where electrolyte 14 is a binary system or a ternary system, the hydroxide electrolyte mixture may be a eutectic mixture, meaning that the mixture of hydroxide electrolytes melts at a single temperature that is lower than the melting temperatures of its constituent hydroxide electrolytes. For example, lithium hydroxide has a melting temperature of about 460° C., and sodium hydroxide has a melting temperature of about 300° C., but a eutectic mixture of lithium hydroxide and sodium hydroxide melts at about 200° C. Consequently, if one would like electrolyte 14 to have a comparatively low melting temperature, one may wish to employ a binary or ternary electrolyte system having a eutectic mixture. An electrolyte with a comparatively low melting temperature may be desirable, for example, where composite membrane 11 is intended to be used in an electrolyzer operated at a comparatively low operating temperature, the electrolyte melting temperature being lower than the electrolyzer operating temperature to ensure the electrolyte will be in a molten state at the electrolyzer operating temperature. A low electrolyzer operating temperature may be desirable where one wishes to minimize electrolyzer degradation, including degradation of composite membrane 14, since high operating temperatures typically correlate with greater degradation. On the other hand, if one would like electrolyte 14 to have a comparatively high melting temperature, one may wish to employ a single electrolyte system or an electrolyte system that does not include a eutectic mixture. An electrolyte with a comparatively high melting temperature may be desirable, for example, where composite membrane 11 is intended to be used in an electrolyzer operated at a comparatively high operating temperature, the operating temperature of the electrolyzer being higher than the melting temperature of the electrolyte. A high electrolyzer operating temperature may be desirable where one wishes to maximize electrolyzer efficiency since high operating temperatures typically correlate with high electrolyzer efficiency. Therefore, depending on whether one wishes to prioritize minimizing thermal stress (i.e., electrolyzer degradation) or maximizing electrolyzer efficiency, one may select an electrolyte that is well-suited for a particular operating temperature.

Composite membrane 11 may be formed in a variety of different ways. For example, according to one embodiment, a mixture comprising one or more types of support particles (e.g., one or more metal oxide particles) and one or more types of electrolyte particles (e.g., one or more alkali hydroxide particles and/or alkaline earth hydroxides particles) may be subjected to a sufficiently high pressure so as to form a compacted mass, with the support particles of the compacted mass defining pores therebetween and with the electrolyte particles of the compacted mass being positioned within such pores. Then, the foregoing compacted mass may be heated to a sufficiently high temperature so as to melt the electrolyte particles, without melting the support particles, whereby the molten electrolyte fills the pores between the support particles. The molten electrolyte then may be allowed to cool to a solid state within the pores. Thereafter, during operation in an electrolyzer or other device, the electrolyte may be subjected to operating temperatures that are sufficiently high to cause the electrolyte to become molten once again, the molten electrolyte being retained within the pores of the porous support.

Alternatively, according to another embodiment, the above-described steps of applying pressure and of applying heat to the mixture of support particles and electrolyte particles may be performed concurrently, instead of sequentially.

Alternatively, according to still another embodiment, composite membrane 11 may be formed by a tape casting method. Such a tape casting method may comprise, for example, forming a slurry that comprises the support particles, the electrolyte particles, and a solvent (and may also comprise a binder), then casting the slurry onto a surface, for example, using a doctor blade, to form a cast slurry (or "green sheet"), then drying the cast slurry to form a tape (or "green tape"). The tape may be heated during the drying step, or in a subsequent step, to a sufficient temperature to cause the electrolyte to melt.

Alternatively, according to still yet another embodiment, porous support 13 may be formed by a tape casting method and then molten electrolyte may be introduced into the pores of porous support 13. The molten electrolyte that is introduced into the pores of porous support 13 may be poured into the pores of porous support 13 by a person or machine, or the molten electrolyte may flow into the pores of porous support 13 from a nearby source of the electrolyte in solid form that has been heated. For example, solid electrolyte may be stored in a nearby component of a water electrolyzer, such as an electrode or a frame component. Such a component may be heated during operation of the water electrolyzer, thereby causing the solid electrolyte therein to become molten and to flow from the nearby component into the pores of the porous support. More specifically, molten hydroxide electrolyte can be stored in one or more of a cathode, an anode, a cathode frame channel, or an anode frame, channel. For example, the frame channel of an upper electrode can be filled with a molten hydroxide electrolyte and then can move toward the matrix through gravity, diffusion, etc. The porous structure can be formed after organic additives have been burned-out during pretreatment so that the molten electrolyte easily passes through the electrode.

As can be appreciated, composite membrane 11 is preferably designed to provide ionic transport, gas separation, and perimeter seal formation. As noted above, in a preferred embodiment, composite membrane 11 may comprise a layer of tightly packed powder impregnated with an alkali hydroxide electrolyte to form a composite paste-like structure at its operating temperature. The stability of composite membrane 11 and the robustness of composite membrane 11 to withstand thermo-mechanical stress are important considerations as they impact electrolyzer performance and endurance. The precursor powders for porous support 13 and electrolyte 14 can be made into composite membrane 11 via a tape casting approach. A key factor that influences the success of this technology is the microstructure of porous support 13, said microstructure enabling the retention of electrolyte therewithin. The thickness, porosity, and pore structure of porous support 13 largely determine whether porous support 13 can successfully retain molten electrolyte within its pores, particularly over an extended period of time, such as 5 years.

Although not shown in the present embodiment, composite membrane 11 may further comprise one or more additives or additional components. Examples of such additives or additional components may include one or more of the following: (i) one or more coarsening inhibitors; (ii) one or more crack attenuators; and (iii) one or more reinforcing materials.

The aforementioned coarsening inhibitor may serve to inhibit Ostwald ripening, i.e., a growth of the particles making up porous support 13. Such particle growth may be undesirable as it may result in an increase in the mean pore size of porous support 13 and, as a result, may cause a reduction in electrolyte retention within porous support 13. Examples of coarsening inhibitors may include one or more metal oxides and/or one or more lithiated metal oxides (e.g., $\alpha$—$Al_2O_3$, $MnO_2$, $Fe_2O_3$, $\alpha$—$LiAlO_2$, $LiFe_2O_3$, etc.). Preferably, the coarsening inhibitor (i) has a different crystal structure than that of the material of porous support 13, (ii) exhibits good stability in the electrolyte, and (iii) has an appropriate surface area/particle size. While not wishing to be limited to any particular theory behind the invention, it is believed that the coarsening inhibitor precipitates preferentially on the crystallographic planes/edges of the porous support powder to disrupt the Ostwald ripening process, thereby inhibiting its coarsening. A particle surface area of the coarsening inhibitor that is similar to that of the porous support material is desirable. Preferably, the coarsening inhibitor volume fraction is optimized to reduce the incidence of coarsening while avoiding a negative impact on electrolyzer performance. To this end, for example, the coarsening inhibitor may have a surface density of about 10 $m^2$/g to about 50 $m^2$/g, the coarsening inhibitor may have a particle size of about 5 nm to about 0.5 µm, and the coarsening inhibitor may be present in an amount constituting about 1 vol. % to about 5 vol. % relative to the porous support matrix material.

The aforementioned crack attenuator may serve to increase the cracking resistance and the thermal cycle capability of composite membrane 11. Examples of crack attenuators may include one or more of the following materials: $\alpha$—$Al_2O_3$, stabilized zirconia, $CeO_2$, and $ZrO_2$—$Al_2O_3$. Such materials may be in one or more of a variety of appropriate geometries, such as, but not limited to, a rounded shape, a disk shape, a rod, or a fiber. A $ZrO_2$—$Al_2O_3$ boulder or particle may include 60 wt. % $ZrO_2$ and 40 wt. % $Al_2O_3$. The range of particle size may be from about 10 μm to about 100 μm, and the crack attenuator may represent about 10 to 30 wt. % volume fraction of the porous support matrix material.

As can be seen from the above, there may be some overlap in the types of materials that may be used as a coarsening inhibitor and the types of materials that may be used as a crack attenuator. However, even when the same type of material is used both as a crack attenuator and as a coarsening inhibitor, it may be noted that the particle size of the material serving as a crack attenuator is preferably larger than the particle size of the material serving as a coarsening inhibitor.

The aforementioned reinforcing material may serve to increase the mechanical strength and thermal cycle capability of composite membrane 11. The reinforcing material may be made of, for example, one or more of aluminum, cerium oxide, and zirconium oxide, and may be in the form of particles or a mesh. The reinforcing material may be used in appropriate geometries such as a rounded shape, a disk shape, a rod, or a fiber. A suitable particle size for the reinforcing material may about 1 μm to about 50 μm, preferably about 3 μm to about 10 μm, and the reinforcing material may constitute about 5 vol. % to about 30 vol. % relative to the porous support matrix material.

A composite membrane comprising one or more of the above-discussed additives (or other additives) may be formed according to one or more of the techniques described above. For example, according to one embodiment, a porous support in the form of a green tape matrix with additives may be made by the following tape casting process: A green tape matrix may be made of at least two green layers that are laminated, each layer having the same composition. The matrix slurries may be prepared by mixing and milling support matrix materials, such as yttria-stabilized zirconia (YSZ), and inorganic additives, such as a crack attenuator and one or more reinforcing materials, in an organic solvent that is compatible with all of the matrix ingredients. The organic solvent may be ethanol or a mixture of ethanol and toluene and may additionally contain an appropriate dispersant, such as DISPERBYK®-110 dispersent (BYK-Chemie GmbH, Wesel, Germany), that provides efficient de-agglomeration or de-flocculation during the milling process. The slurry portion may further comprise a crack attenuator in the form of alumina boulders (10 vol % to 20 vol % of dried green tape) with an appropriate amount of a binder system (15 wt % to 25 wt %) containing a polyvinyl butyral B-76 and a plasticizer dibutyl phthalate to prepare a green tape matrix. Next, a reinforcing material in the form of Al powder (5 to 30 vol. %) may be introduced into the slurry, followed by milling for 48 hours, to provide a final slurry. Then, the final slurry is subjected to tape casting using a doctor blade to provide an electrolyte matrix green tape.

As noted above, composite membrane 11 may be used in place of the alkaline exchange membrane of an alkaline water electrolyzer.

Figure 2A:
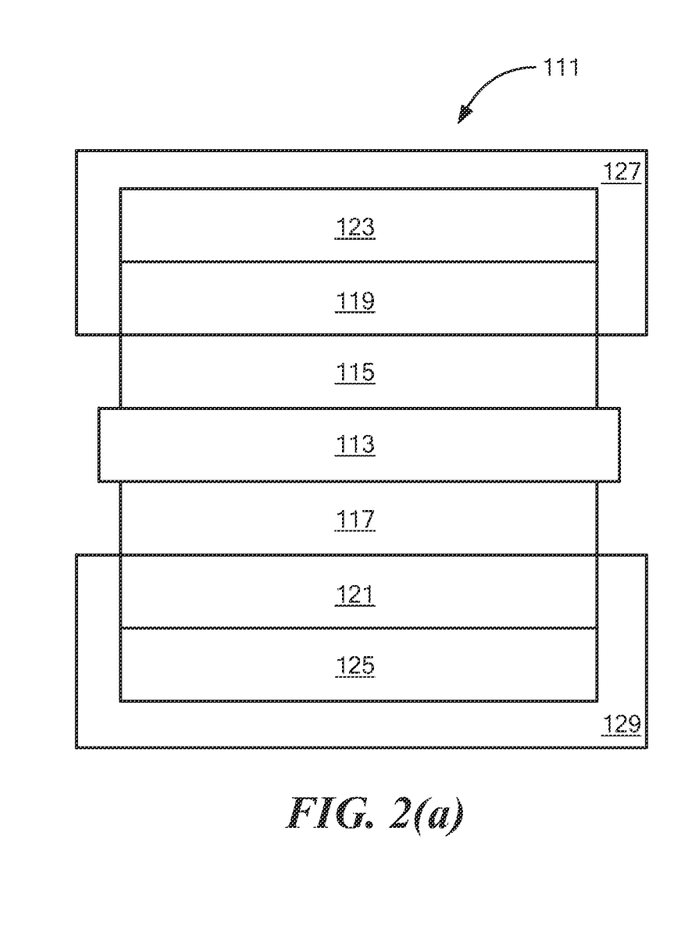
FIGS. 2(a) and 2(b) are simplified section and exploded perspective views, respectively, of one embodiment of an alkaline membrane water electrolyzer constructed according to the present invention.
Figure 2B:
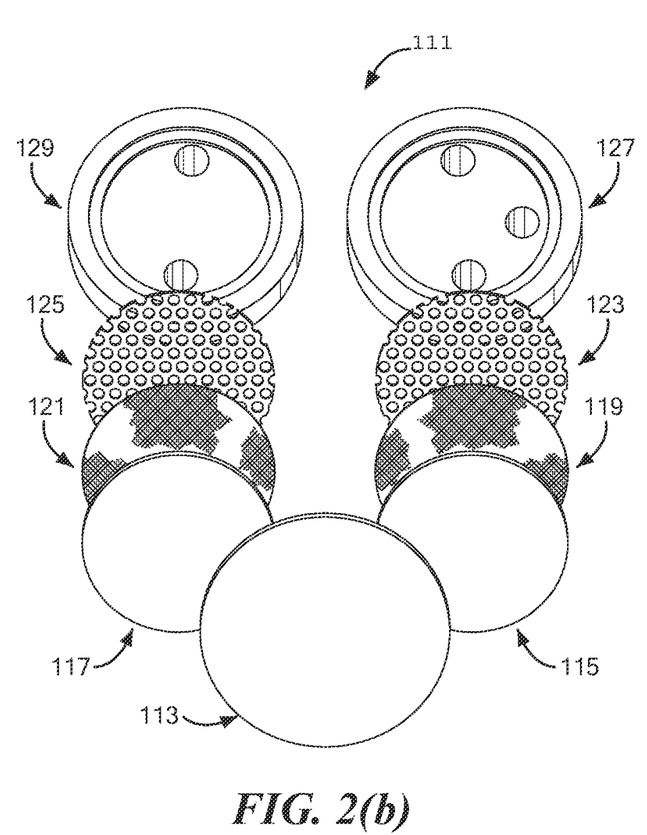

Referring now to FIGS. 2(a) and 2(b), there are shown various views of a first embodiment of an alkaline membrane water electrolyzer constructed according to the teachings of the present invention, the alkaline membrane water electrolyzer being represented generally by reference numeral 111. Details of alkaline membrane water electrolyzer 111 that are discussed elsewhere in this application or that are not critical to an understanding of the invention may be omitted from FIGS. 2(a) and 2(b) and/or from the accompanying description herein or may be shown in FIGS. 2(a) and 2(b) and/or described herein in a simplified manner. (It should be noted that, whereas, in FIG. 2(b), both the anode-side components and the cathode-side components are depicted as being on the same side of the composite membrane, the anode-side components and the cathode-side components are actually disposed on opposite sides of the composite membrane.)

Alkaline membrane water electrolyzer 111 may comprise a composite membrane 113, an anode 115, and a cathode 117.

Composite membrane 113 may be identical to composite membrane 11. Anode 115 may be positioned against one of the two major faces of composite membrane 113, and cathode 117 may be positioned against the other of the two major faces of composite membrane 113. Anode 115, which may be in the form of a green tape, may comprise a $NixCo_3O_4$ alloy. Cathode 117, which may be in the form of a green tape, may comprise a NiAl alloy.

Each of anode 115 and cathode 117 may be made by a tape casting process. For example, Ni—Al or Ni—Cr alloy powders may be used for cathode 117, and NiO or NixCoOx catalyst powders may be used for anode 115. Electrodes slurries may be prepared by mixing and milling the respective electrode materials in an organic solvent that is compatible with the electrode ingredients. Examples of such an organic solvent may include ethanol or a mixture of ethanol and toluene and may further comprise an appropriate dispersant, such as DISPERBYK®-110 dispersent (BYK-Chemie GmbH, Wesel, Germany), a dispersant that provides efficient de-agglomeration or de-flocculation during the milling process. The electrode slurry portion may further include an appropriate amount of a binder system (15 wt % to 25 wt %) containing a polyvinyl butyral B-76 and plasticizer dibutyl phthalate to prepare a green tape electrode. The slurries may be milled for 48 hours to provide final slurries. The final slurries then may be subjected to tape casting using a doctor blade to provide green tape electrodes. The electrode slurries may be tape cast by doctor blade for different thicknesses (e.g., 100-300 μm).

Alkaline membrane water electrolyzer 111 may further comprise an anode mesh screen 119 and a cathode mesh screen 121, wherein mesh screens 119 and 121 may be function as gas diffusion layers for alkaline membrane water electrolyzer 111. Anode mesh screen 119, which may be made of, for example, a stainless steel (e.g., 316 stainless steel), may be positioned against the major face of anode 115 that is located opposite to composite membrane 113. Cathode mesh screen 121, which may be made of, for example, nickel, may be positioned against the major face of cathode 117 that is located opposite to composite membrane 113.

Alkaline membrane water electrolyzer 111 may further comprise an anode current collector 123 and a cathode current collector 125. Anode current collector 123, which may be made of, for example, a stainless steel (e.g., 316 stainless steel), may be positioned against the major face of anode mesh screen 119 that is located opposite to anode 115. Cathode current collector 125, which may be made of, for example, a nickel-coated stainless steel (e.g., nickel-coated 316 stainless steel), may be positioned against the major face of cathode mesh screen 121 that is located opposite to cathode 117.

Alkaline membrane water electrolyzer 111 may further comprise an anode-side cell frame 127 and a cathode-side cell frame 129. Anode-side cell frame 127, which may be used to house anode mesh screen 119 and anode current collector 123, may be, for example, an aluminized wet-seal area cell frame. Cell frame 129, which may be used to house cathode mesh screen 121 and cathode current collector 125, may be, for example, an aluminized wet-seal area cell frame.

Although not shown, a gasket or other structure may be used to peripherally seal composite membrane 113, anode 115, and cathode 117. Also, although not shown, it is to be understood that the alkaline membrane water electrolyzer preferably comprises a source of electrical current and electrical leads coupled to the electrical current source and to current collectors 123 and 125 so that electricity may be supplied to the above-described assembly for the electrolysis of water.

In another embodiment (not shown), the alkaline membrane water electrolyzer may further comprise a heater for melting the electrolyte in composite membrane 113.

The operating temperature of alkaline membrane water electrolyzer 111 may be about 0° C. to about 300° C. higher than the melting point of electrolyte 14. In most cases, the operating temperature of alkaline membrane water electrolyzer 111 may be somewhere in the range of about 200° C. to about 600° C., preferably somewhere in the range of 250° C. to about 500° C. or somewhere in the range of about 350° C. to about 550° C. Operation within this temperature range may enable higher efficiencies to be attained than those typically attainable using alkaline exchange membrane electrolyzers and, at the same time, may avoid using a temperature that is so high as to cause degradation of electrolyzer components.

Figure 3:
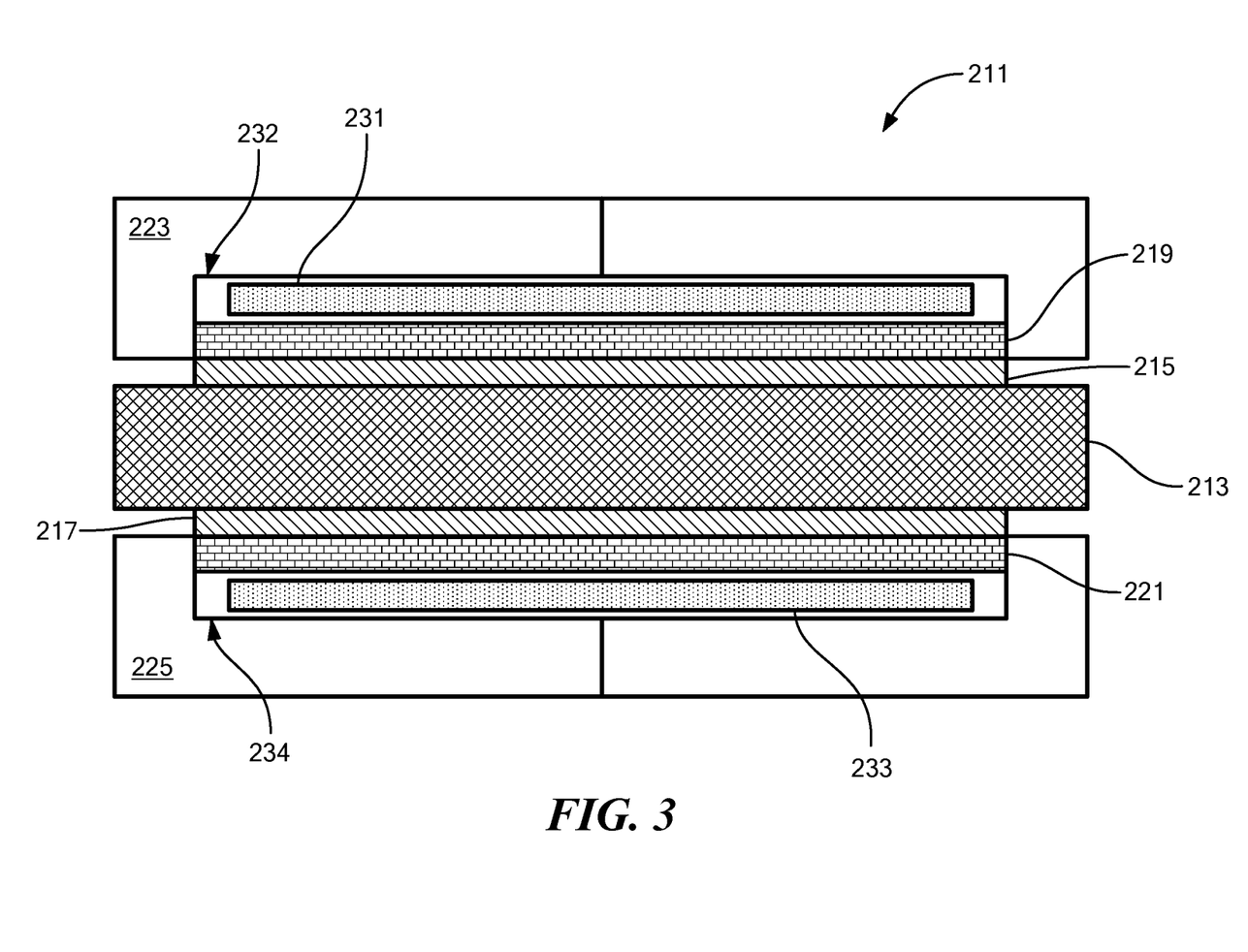
FIG. 3 is a simplified section view of a second embodiment of an alkaline membrane water electrolyzer constructed according to the present invention.

Referring now to FIG. 3, there is shown a simplified section view of a second embodiment of an alkaline membrane water electrolyzer constructed according to the present invention, the alkaline membrane water electrolyzer being represented generally by reference numeral 211.

Electrolyzer 211, which is similar in certain respects to electrolyzer 111, may comprise a porous support 213, an anode 215, a cathode 217, an anode current collector 219, a cathode current collector 221, an anode cell frame 223, and a cathode cell frame 225.

Porous support 213 may be similar to porous support 13. In other words, porous support 213 may be like composite membrane 11, except that porous support 213 may lack electrolyte in its pores or may include only a small amount (i.e., substantially less than fully capacity) of electrolyte in its pores.

Anode 215, cathode 217, anode current collector 219, cathode current collector 221, anode cell frame 223, and cathode cell frame 225 may be similar or identical to anode 115, cathode 117, anode current collector 123, cathode current collector 125, anode cell frame 127 and cathode cell frame 129, respectively.

Electrolyzer 211 may further comprise a first solid electrolyte block 231 and a second solid electrolyte block 233. First solid electrolyte block 231, which may comprise the same type of electrolyte material that is included in composite membrane 11, may be positioned within an anode flow channel 232 of anode cell frame 223. Second solid electrolyte block 233, which may comprise the same type of electrolyte material that is included in composite membrane 11, may be positioned within a cathode flow channel 234 of cathode cell frame 225. First and second solid electrolyte blocks 231 and 233 may be identical to one another in size, shape and composition or may differ from one another in at least one of size, shape and composition in composition.

Either during the operation of electrolyzer 211 or as a preparatory step to using electrolyzer 211, first and/or second solid electrolyte blocks 231 and 233 may be heated sufficiently so as to cause the electrolyte thereof to melt, with the molten electrolyte then flowing into and filling the pores of porous support 213.

The present invention is believed to have many advantages and benefits over existing approaches. Some of these advantages and benefits include, but are not limited to, the following: (1) the materials used to make the composite membrane (e.g., metal oxide, hydroxide) are comparatively inexpensive, particularly as compared to the cost of alkaline exchange membranes; (2) the hydroxide ion conductivity of molten hydroxide electrolyte is higher than that of conventional alkaline exchange membranes (likely due, in part, to the fact that a molten hydroxide has greater hydroxide ion mobility than do the hydroxide groups of an alkaline exchange membrane); (3) the composite membrane of the present invention is capable of being operated at significantly higher temperatures than are alkaline exchange membranes, thus leading to high electrical efficiency; (4) the composite membrane exhibits high electrical efficiency, offers flexible operating temperatures, and possesses good durability; and (5) the composite membrane does not require the use of precious metal catalysts, thus leading to low capital cost of water electrolyzers.

Table I below provides a comparison of different types of water electrolysis techniques with the technique of the present invention being referred to therein as molten alkaline electrolysis.

TABLE I

| Water Electrolysis Technology | Electrolyte Conductivity | Operating Temperature (° C.) | Durability | Resistance to Impurity | Cost of Balance of Plant | Electrical Efficiency (Lower Heating Value $H_2$) |
|---|---|---|---|---|---|---|
| Alkaline Electrolysis | Low (0.1 S/cm) | Low (<90° C.) | High (<7 years, <3 µV/h) | Low | Low | Low (60-80%) |
| PEM Electrolysis | Low (0.2 S/cm) | Low (<90° C.) | Intermediate (>5 years) | Low | High | Low (60-80%) |
| Solid Oxide Electrolysis | High (>0.2 S/cm) | High (>700° C.) | Low (<5 years) | High | High | High (>90%) |
| Molten Alkaline Electrolysis | High (>0.5 S/cm) | Intermediate to high (200° C. to 600° C.) | Expected to be intermediate (>5 years) | High | Low | High (>90%) |

As can be seen, the technique of the present invention possesses favorable characteristics with respect to many of the metrics identified above, perhaps lacking only with respect to its projected durability (which is expected to be somewhere in the intermediate range).

The following examples are provided for illustrative purposes only and are in no way intended to limit the scope of the present invention:

EXAMPLE 1

Figure 4:
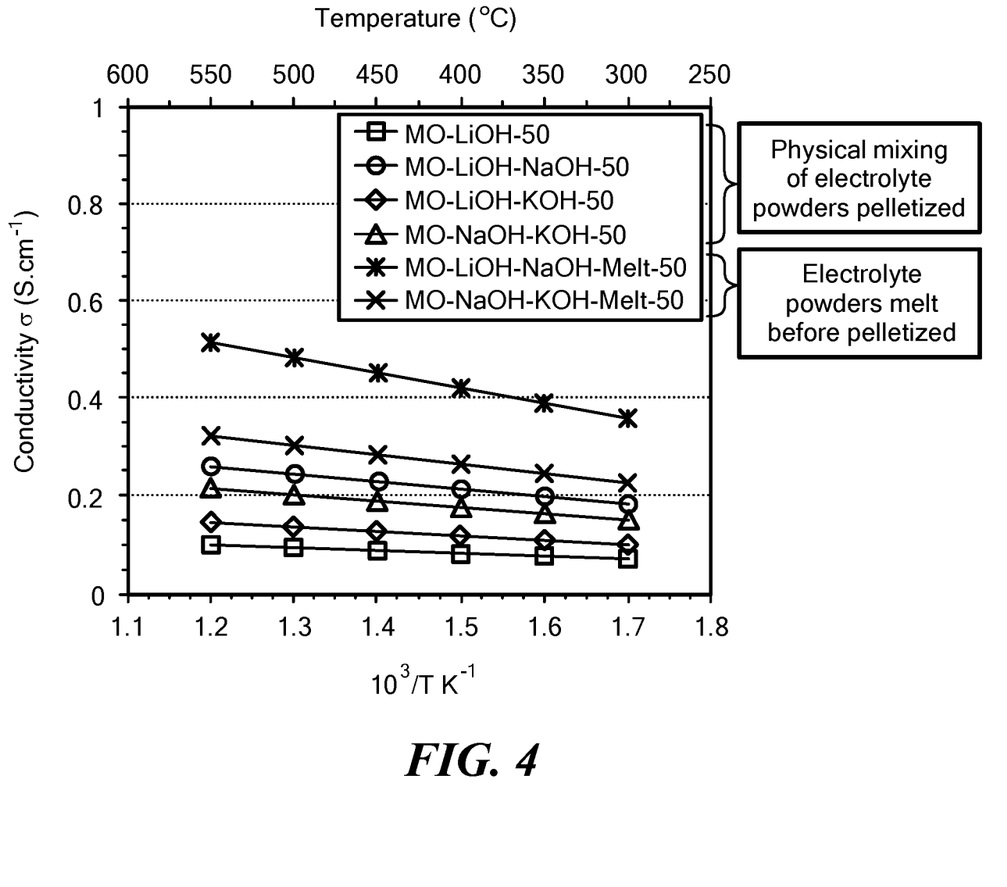
FIG. 4 is a graph depicting the results obtained in Example 1.

Various mixtures of a metal oxide and one or more hydroxides were investigated. The metal oxide was selected from the group consisting of $LiAlO_2$, $ZrO_2$, YSZ, SiC and MgO and, more specifically, was yttria-stabilized zirconia (YSZ). The one or more hydroxides were either (1) a single hydroxide system of lithium hydroxide or (2) a binary hydroxide system of lithium hydroxide-sodium hydroxide, lithium hydroxide-potassium hydroxide, or sodium hydroxide-potassium hydroxide. Each mixture was placed inside a 13.0 mm metal die, which was then placed into a hydraulic press wherein a pressure of 2 tons was applied. The green pellets were sintered at 650° C. for 2 h to get a uniform distribution of hydroxide melt in the metal oxide support. The sintered pellets of mixed hydroxide and metal oxide were painted with silver paste on both sides of the pellet area of 0.20 $cm^2$ as electrodes. The Ag-coated pellets were fired at 650° C. for 2 h to ensure a good bond between the sample surface and silver paste so as to provide a good electronic contact effect. The average composite electrolyte membrane consisted of about 40 wt. % of hydroxide and about 60 wt. % of metal oxide and had a thickness of about 1.3 mm. The AC impedance was measured using applied frequency range from 0.1 Hz to 1 MHz, and measurements were carried out while the voltage amplitude of 10 mV was applied. AC impedance scans were completed on sintered pellet between the temperatures of 200° C. and 600° C. The temperature dependencies of hydroxide ion conductivities for the pelletized composite membranes are shown in FIG. 4. The binary LiOH/NaOH hydroxide melt showed the highest hydroxide ion conductivity, 0.52 S/cm at 550° C. The hydroxide ion conductivities of the various electrolytes improved with increasing temperature. The hydroxide ion conductivity of the LiOH—NaOH eutectic composition was higher than that of the LiOH—KOH or NaOH—KOH compositions.

EXAMPLE 2

Figure 5:
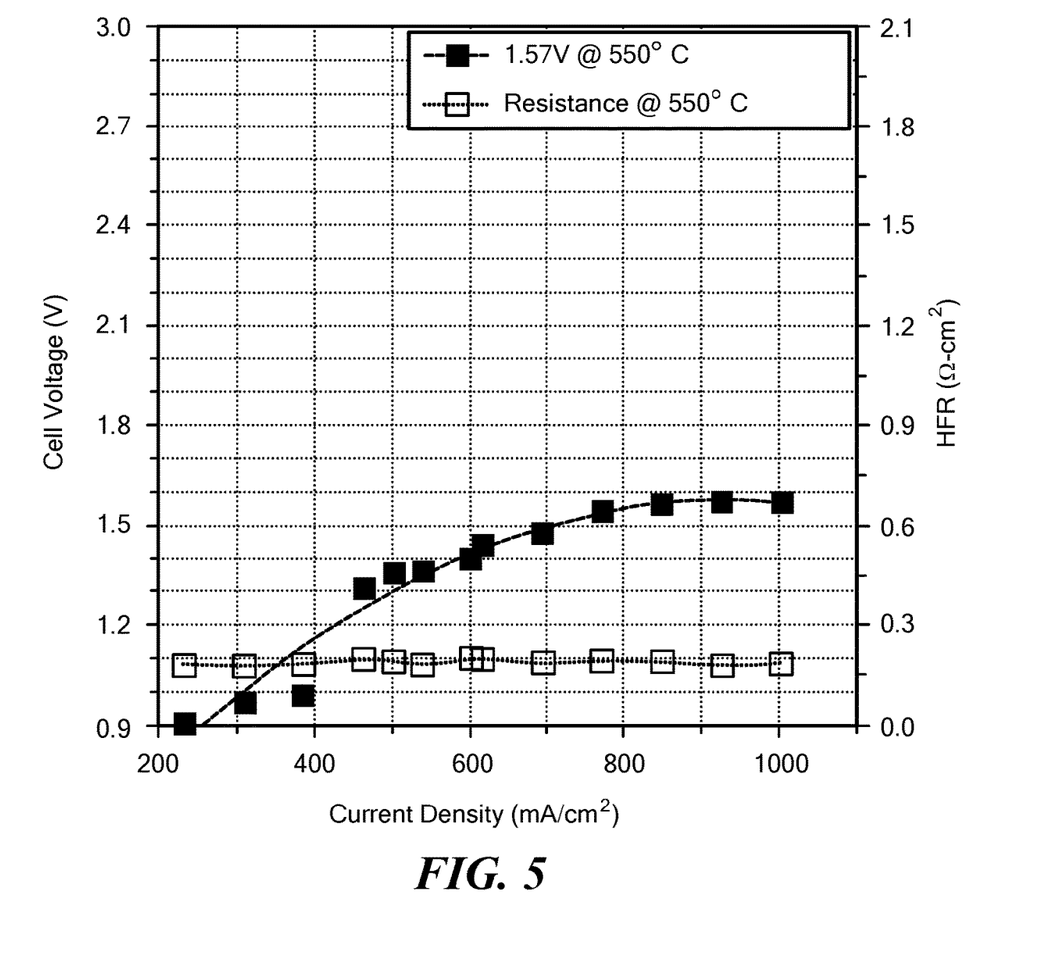
FIG. 5 is a graph depicting the results obtained in Example 2.

An anode, a cathode, and a metal oxide porous support matrix were fabricated by the tape casting method. The green tape fabrication of the electrodes and the matrix were optimized for a solvent-based slurry formulation process. The prepared slurry was poured onto a sheet of MYLAR® polyester film (DuPont Teijin Films US, Wilimington, DE) set on a bench top caster and spread as a thin layer, and a green tape electrode or matrix was cast by a doctor blade. The green tape was allowed to dry at elevated temperature using the casting apparatus's heating system. The electrodes and matrix were incorporated into an electrolyzer button cell, and the button cell was tested for electrolyzer performance. The hydroxide electrolyte powders were stored in the cathode channel of the button cell separator. During the pretreatment process, after the organic additives burned out, the hydroxide electrolyte easily penetrated into the matrix from the cathode channel. The button cell was subject to pre-treatment for 48 h in $N_2$ in a temperature range from 25° C. to 300° C. to burn out the organic material contained in the anode, the cathode, and the matrix. Then, the temperature was raised from 200° C. to 600° C. to allow the hydroxide electrolyte to melt and to penetrate into the matrix. Saturated steam humidified at 90° C. with $N_2$ gas was introduced into the cathode cell frame to initiate water electrolysis. The performance of the electrolyzer cell is shown in FIG. 5. The button cell was capable of high current density, up to 1000 $mA/cm^2$.

EXAMPLE 3

Another electrolyzer button cell was tested for electrolyzer performance. The anode frame, cathode frame, and current collectors of the button cell were made with high corrosion resistance stainless steel (S316) materials. The anode, the cathode, and the metal oxide porous support matrix of the button cell were fabricated by the tape casting method. Hydroxide electrolyte powders were stored in the anode channel of the separator. During the pretreatment process, after the organic additives burned out, the hydroxide electrolyte easily penetrated into the matrix from the anode channel.

The button cell was subject to pre-treatment for 48 h in $N_2$ in a temperature range from 25° C. to 300° C. to burn out the organic material contained in the anode, the cathode, and the matrix; then, the temperature was raised from 300° C. to 550° C. to allow the hydroxide electrolyte to melt and penetrate into the matrix. Saturated steam humidified at 90° C. with $N_2$ gas was introduced into the cathode cell frame to initiate the water electrolysis. I-V polarization and resistance of the button cell were measured by high-frequency resistance equipment installed in the high-temperature electrolysis cell.

Figure 6:
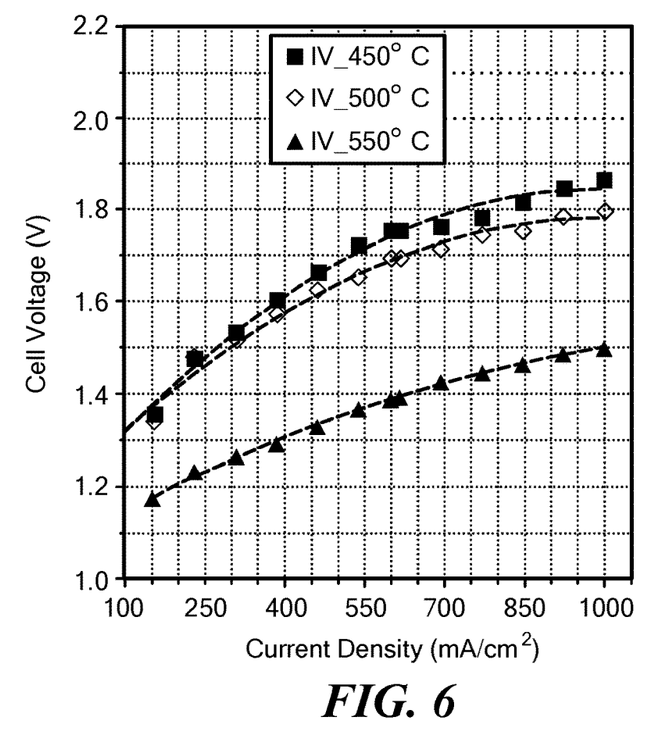
FIG. 6 is a graph depicting the cell performance of the electrolyzer cell of Example 3 with a matrix thickness of 450 µm, the electrolyzer cell being operated at different temperatures.

The effect of matrix thickness on electrolyzer cell performance and durability at different temperatures (e.g., 450 to 550° C.) was tested. In this cell, saturated steam humidified at 90° C. with $N_2$ gas was introduced into the cathode cell frame to initiate the water electrolysis. FIG. 6 shows the polarization curve of the electrolyzer cell operated at different temperatures with a matrix thickness of 450 μm. The electrolyzer cell voltages were 1.50 V at 550° C., 1.80 V at 500° C., and 1.87 V at 450° C. for a constant current density of 1000 $mA/cm^2$. An increase in temperature from 450° C. to 550° C. significantly increased the cell performance (i.e., almost 0.37V), probably due to the increase in the rates of the electrochemical reactions. Furthermore, the increase in temperature improved the ionic conductivity of the electrolyte, which could also have an impact on the operation of the electrolyzer cell.

Figure 7:
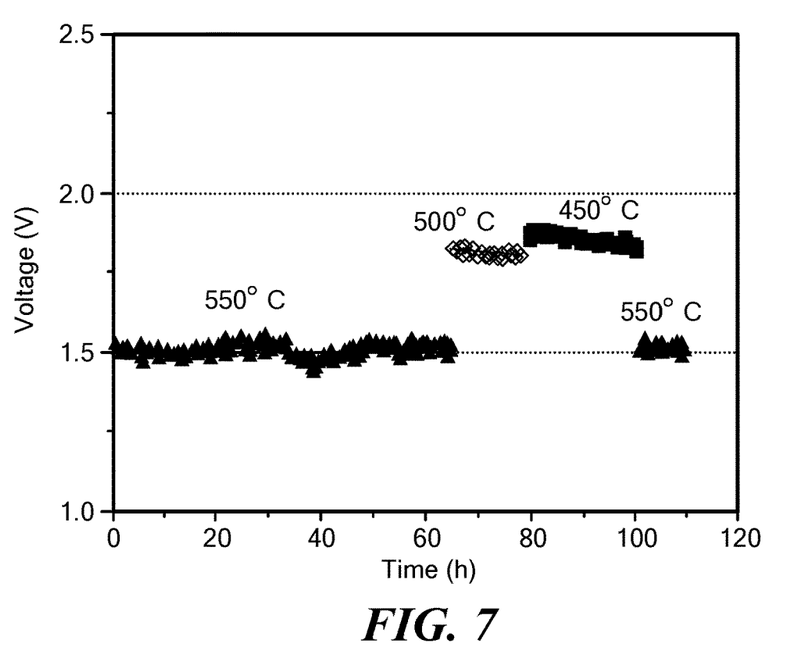
FIG. 7 is a graph depicting the cell durability of the electrolyzer cell of Example 3 with a matrix thickness of 450 µm, the electrolyzer cell being operated at different temperatures.

Long term cell durability testing at different temperatures was also performed. The electrolyzer cell under a constant current density at 1000 $mA/cm^2$ exhibited a very stable performance at 550° C., as can be seen in FIG. 7. The cell durability test showed no obvious degradation when the cell operated for approximately 120 h. In order to determine the cell durability at different temperatures, the cell performance at 500° C. and 450° C. were also tested at a constant current density of 1000 $mA/cm^2$. It can be seen that a sharp increase in cell voltage from 1.50V to 1.80V at 500° C. and 1.87V at 450° C. was observed after cell temperature decreased from 550° C., due to lower catalytic activity of the Ni-based electrodes. The cell voltage can be immediately recovered to the value of 1.50V after the cell temperature is increased to the 550° C. These results demonstrate that the cell performance at 550° C. has fast response and recovery ability of the electrolyzer cell over a time period of 24 h.

Figure 8:
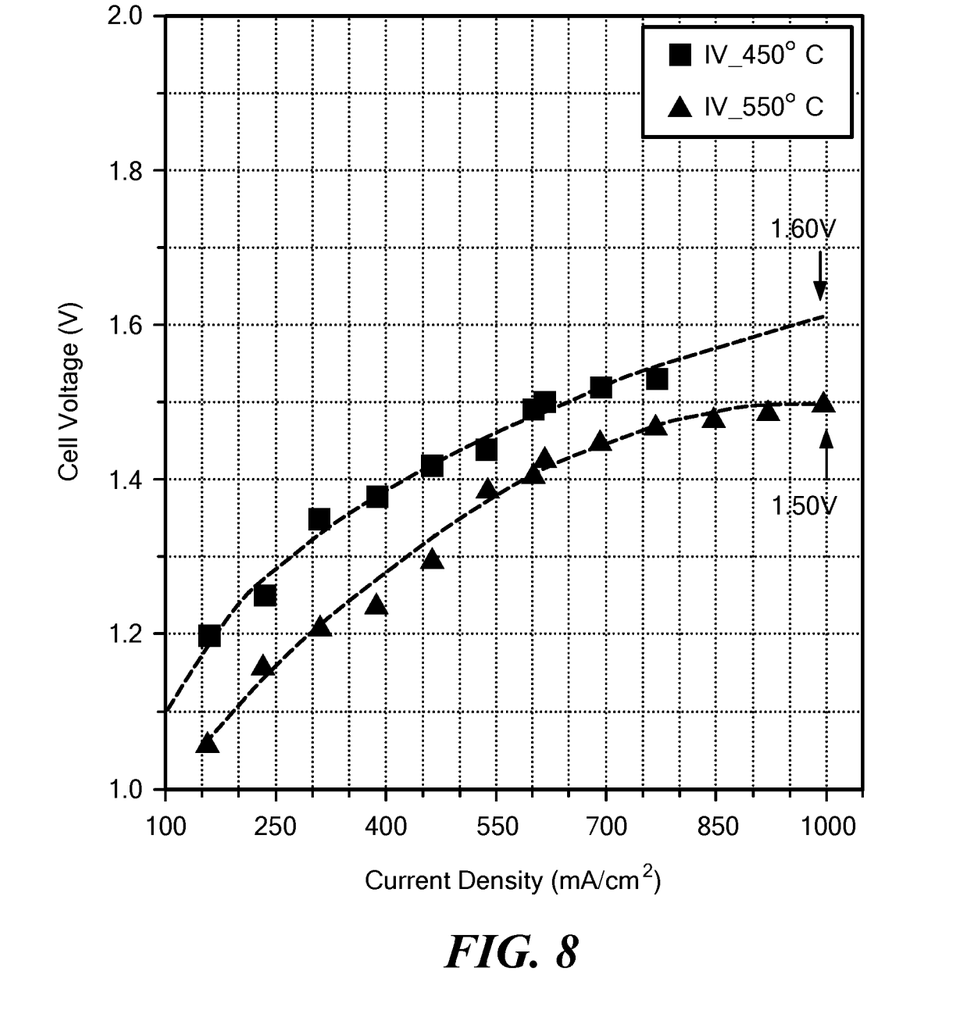
FIG. 8 is a graph depicting the cell performance of the electrolyzer cell of Example 3 with a matrix thickness of 300 µm, the electrolyzer cell being operated at different temperatures.

FIG. 8 shows the polarization curve of the electrolyzer cell with a matrix thickness of 300 µm operated at different temperatures. The electrolyzer cell voltages were 1.50V at 550° C. and 1.60V at 450° C. for a constant current density of 1000 mA/cm². The electrolyzer cell performance was improved using a matrix thickness of 300 µm as compared to a matrix thickness of 450 µm at 450° C. due to the very low resistance of the cell. However, no significant change in cell performance was observed at a temperature of 550° C. Cell decay began within approximately 24 h with gas crossover. The matrix stability, in terms of crack formation, was investigated by measuring the $N_2$ cross-over in the cathode outlet and anode outlet flow rate in the OCV (open circuit voltage) condition. Therefore, the matrix thickness of 300 µm is an effective means of increasing the performance at 450° C. via decreasing the internal resistance while providing the minimum matrix thickness.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A composite membrane suitable for use in an alkaline membrane water electrolyzer, the composite membrane comprising:
   (a) a porous support, the porous support comprising a plurality of particles aggregated to form a matrix having a random structure, with pores provided in spaces between the particles, and wherein prior to their aggregation, the particles have a particle size of 0.2 µm to 1.0 µm;
   (b) a molten electrolyte, the molten electrolyte disposed within the pores of the porous support, the molten electrolyte having hydroxide ion conductivity and comprising at least one member of the group consisting of alkali hydroxides and alkaline earth hydroxides; and
   (c) a coarsening inhibitor, wherein the coarsening inhibitor comprises at least one species selected from the group consisting of $\alpha$-$Al_2O_3$ and $\alpha$—$LiAlO_2$, wherein the coarsening inhibitor has a particle surface area that is similar to that of the particles of the porous support, and wherein the coarsening inhibitor has a different crystal structure than that of the particles of the porous support.

2. The composite membrane as claimed in claim 1 wherein the pores comprise tortuous pores formed at least in part by spaces between the particles.

3. The composite membrane as claimed in claim 2 wherein the particles comprise one or more types of metal oxide particles.

4. The composite membrane as claimed in claim 3 wherein the one or more types of metal oxide particles are selected from the group consisting of $LiAlO_2$ particles, $ZrO_2$ particles, yttria-stabilized zirconia particles, $Al_2O_3$ particles, $TiO_2$ particles, MgO particles, and combinations thereof.

5. The composite membrane as claimed in claim 3 wherein the porous support has a pore size of 0.05 µm to 2 µm, a porosity of 30% to 80%, and a thickness of 100 µm to 400 µm.

6. The composite membrane as claimed in claim 5 wherein the porous support has a pore size of 0.1 µm to 0.2 µm.

7. The composite membrane as claimed in claim 5 wherein the porous support has a porosity of 45% to 55%.

8. The composite membrane as claimed in claim 3 wherein the one or more types of metal oxide particles are selected from the group consisting of $TiO_2$ particles, MgO particles, and combinations thereof.

9. The composite membrane as claimed in claim 1 wherein the molten electrolyte completely fills the pores of the porous support.

10. The composite membrane as claimed in claim 1 wherein the molten electrolyte has a melting temperature in the range of 200° C. to 600° C.

11. The composite membrane as claimed in claim 10 wherein the molten electrolyte is at least one type of alkali hydroxide.

12. The composite membrane as claimed in claim 11 wherein the molten electrolyte is a single species of alkali hydroxide selected from the group consisting of lithium hydroxide, sodium hydroxide, potassium hydroxide and cesium hydroxide.

13. The composite membrane as claimed in claim 11 wherein the molten electrolyte is a combination of two or more species of alkali hydroxide selected from the group consisting of lithium hydroxide, sodium hydroxide, potassium hydroxide and cesium hydroxide.

14. The composite membrane as claimed in claim 11 wherein the molten electrolyte is a eutectic mixture of at least two species of alkali hydroxide selected from the group consisting of lithium hydroxide, sodium hydroxide, potassium hydroxide and cesium hydroxide.

15. The composite membrane as claimed in claim 11 wherein the molten electrolyte comprises cesium hydroxide.

16. The composite membrane as claimed in claim 10 wherein the molten electrolyte comprises at least one alkaline earth hydroxide.

17. The composite membrane as claimed in claim 10 wherein the molten electrolyte is a ternary system comprising a combination of three different hydroxide electrolytes.

18. The composite membrane as claimed in claim 17 wherein the molten electrolyte is a ternary system having a eutectic mixture.

19. The composite membrane as claimed in claim 1 further comprising a crack attenuator.

20. The composite membrane as claimed in claim 19 wherein the crack attenuator comprises at least one species selected from the group consisting of $\alpha$—$Al_2O_3$, stabilized zirconia, $CeO_2$, and $ZrO_2$—$Al_2O_3$.

21. The composite membrane as claimed in claim 20 wherein the crack attenuator is in a form selected from a rounded shape, a disk shape, a rod, and a fiber.

22. The composite membrane as claimed in claim 1 further comprising a reinforcing material.

23. The composite membrane as claimed in claim 22 wherein the reinforcing material comprises particles of at least one of aluminum, cerium oxide, and zirconium oxide.

24. The composite membrane as claimed in claim 23 wherein the reinforcing material is in a form selected from a rounded shape, a disk shape, a rod, and a fiber.

25. The composite membrane as claimed in claim 23 wherein the reinforcing material has a particle size of 1 µm to 50 µm and constitutes 5 vol. % to 30 vol. % relative to the porous support matrix material.

26. A molten hydroxide electrolyzer cell comprising:
   (a) the composite membrane as claimed in claim 1;
   (b) an anode operatively coupled to the composite membrane; and
   (c) a cathode operatively coupled to the composite membrane.

27. The composite membrane as claimed in claim 1 wherein the particles are selected from the group consisting of particles of an oxyanion of a metal, particles of a carbide, particles of a boride, particles of a metal, particles of a nonmetal, and particles of a nonmetal oxide.

28. The composite membrane as claimed in claim 1 wherein the particles comprise a mixture of one or more types of metal oxide particles and at least one member selected from the group consisting of particles of an oxyanion of a metal, particles of a carbide, particles of a boride, particles of a metal, particles of a nonmetal, and particles of a nonmetal oxide.

29. The composite membrane as claimed in claim 1 wherein the molten electrolyte comprises a combination of at least two hydroxide species and wherein the combination of at least two hydroxide species is not a eutectic mixture.

30. The composite membrane as claimed in claim 1 wherein the coarsening inhibitor has a surface density of 10 $m^2/g$ to 50 $m^2/g$, a particle size of 5 nm to 0.5 µm, and is present in an amount constituting 1 vol. % to 5 vol. % relative to the porous support matrix material.

31. A composite membrane suitable for use in an alkaline membrane water electrolyzer, the composite membrane comprising:

(a) a porous support, the porous support comprising a plurality of particles aggregated to form a matrix having a random structure, with pores provided in spaces between the particles, and wherein prior to their aggregation, the particles have a particle size of 0.2 µm to 1.0 µm;

(b) a molten electrolyte, the molten electrolyte disposed within the pores of the porous support, the molten electrolyte having hydroxide ion conductivity and comprising at least one member of the group consisting of alkali hydroxides and alkaline earth hydroxides; and (c) a crack attenuator, wherein the crack attenuator comprises $ZrO_2$—$Al_2O_3$ particles, wherein the $ZrO_2$—$Al_2O_3$ particles comprise 60 wt. % $ZrO_2$ and 40 wt. % $Al_2O_3$, wherein the $ZrO_2$—$Al_2O_3$ particles range in size from 10 µm to 100 µm, and wherein the crack attenuator represents 10 to 30 wt. % volume fraction of the porous support matrix material.

32. The composite membrane as claimed in claim 31 further comprising a coarsening inhibitor.

33. The composite membrane as claimed in claim 32 wherein the coarsening inhibitor comprises at least one species selected from the group consisting of α—$Al_2O_3$, $MnO_2$, $Fe_2O_3$, α—$LiAlO_2$, and $LiFe_2O_3$.

* * * * *